(12) United States Patent
Mallary

(10) Patent No.: US 6,813,106 B1
(45) Date of Patent: Nov. 2, 2004

(54) PREMAGNETIZATION PROCESS FOR PRINTING LONGITUDINAL MEDIA

(75) Inventor: Michael Mallary, Sterling, MA (US)

(73) Assignee: Maxtor Corporation, Longmont, CO (US)

( * ) Notice: Subject to any disclaimer, the term of this patent is extended or adjusted under 35 U.S.C. 154(b) by 323 days.

(21) Appl. No.: 10/136,153

(22) Filed: May 1, 2002

(51) Int. Cl.⁷ .............................................. G11B 5/86
(52) U.S. Cl. ........................................................ 360/17
(58) Field of Search ........................... 360/17, 55, 75, 360/15–16

(56) References Cited

U.S. PATENT DOCUMENTS 6,433,944 B1 * 8/2002 Nagao et al. .................. 30/16

* cited by examiner

Primary Examiner—David Hudspeth
Assistant Examiner—Dan I Davidson
(74) Attorney, Agent, or Firm—Cesari and McKenna, LLP

(57) ABSTRACT

A preconditioning process for contact printing of a reference servo pattern on storage media. The preconditioning process presets the magnetization of problematic grains, that is, grains that typically contribute to spurious subpulses on the media, in the direction of the printing field.

17 Claims, 4 Drawing Sheets

APPLY A VERY HIGH REVERSE FIELD $|H_{max}| > |H_{sat}|$ TO ACHIEVE POSITIVE ORIENTATION FOR ALL GRAINS
50

APPLY A FORWARD FIELD $|H_{med}| < (1-\varepsilon)|H_{sat}|$ AND $> |H_c|$ TO ACHIEVE NEGATIVE ORIENTATION FOR ALL GRAINS WITH A SWITCHING FIELD $< |H_{med}|$
52

APPLY A REVERSE FIELD $|H_{min}| > (1+\delta)|H_{knee}|$ AND $< |H_c|$ TO ACHIEVE POSITIVE ORIENTATION FOR ALL GRAINS WITH A SWITCHING FIELD $< |H_{min}|$
54

PLACE THE MASTER DISK ON THE PRODUCT DISK AND APPLY A REVERSE PRINT FIELD $H_{print} = |H_c|$
26

PREMAGNETIZATION PROCESS FOR PRINTING LONGITUDINAL MEDIA

BACKGROUND

The invention relates generally to magnetic printing and, more particularly, to magnetic printing of storage media.

Various servo techniques or approaches have been developed to reduce the effects of tracking error and thus improve track density. Although known servo techniques vary somewhat, most involve mechanisms for dynamically moving the read head laterally to continually re-position it over the recorded data track. They also use servo heads to provide corrective positioning information.

One approach stores servo information in the form of a pattern of servo marks (or "spokes") on a surface of a storage medium, such as a disk, and reads the recorded servo information to produce a position error signal for accurate head positioning. The servo information can be dedicated (that is, located on a continuous track of servo information) or embedded within the user data.

One well-known mechanism that is used to record the servo pattern is the servo writer process, which formats the surface of the disk with the servo pattern, typically during disk manufacturing. For high track density storage media, the servo writer process can be quite time-consuming, as it requires "N" revolutions (where N is the number of tracks per inch times the number of servo marks per track) to complete.

Another servo writing mechanism is the servo self-write process. The servo self-write process constructs a servo pattern from a reference pattern that is printed on the disk's surface. One type of print process involves the use of a master disk with ferromagnetic teeth. Typically, the disk (or "product" disk) surface is pre-magnetized with a field that is opposite to the printing field. The master disk is brought into contact with the product disk and a printing field is applied to the master disk. The application of the printing field causes magnetization in the direction of the printing field to occur on the product disk in the regions that are not shielded by the master disk teeth. In the regions under the teeth (the shielded regions), the magnetization is unchanged. The magnetic transitions, that is, the borders between the regions under the teeth and regions between teeth, are used by the servo self-write process to construct the servo pattern. Contributions of the field under the teeth to the regions both under and between the teeth, however, can cause an imperfect printing to occur. An imperfect printing, in turn, can result in weak signals, false readings (subpulses) and extra noise, all of which interfere with normal data storage operations. The printing process may be improved through decreased teeth spacing and increased teeth thickness (for better shielding), but such improvements are limited by master disk manufacturing process capabilities.

SUMMARY

In one aspect, the invention provides a method of and apparatus for printing on a storage medium. The method includes applying preconditioning fields to the storage medium to precondition the storage medium prior to applying a printing field, one of the preconditioning fields magnetizing the storage medium in a direction of the printing field and at least another of the preconditioning fields magnetizing the storage medium in a direction opposite to the direction of the printing field. The method further includes applying the printing field to the preconditioned storage medium to produce a pattern of magnetic transitions thereon.

Embodiments of the invention may include one or more of the following features.

Applying the preconditioning fields includes applying a first field of a first magnitude to magnetize a first population of grains of the material in the surface of the medium in the direction of the printing field, applying a second field of a second magnitude to magnetize a second population of grains of the material in the surface of the medium in a direction opposite to the direction of the printing field and applying a third field of a third magnitude to magnetize a third population of grains of the material in the surface in the direction of the printing field.

The first, second and third magnitudes are chosen so that magnetization of only a portion of the second population is changed by the application of the printing field.

The first magnitude is greater than the magnitude of a saturation field, the second magnitude is less than the magnitude of the saturation field and greater than a magnitude of the printing field, and the third magnitude is less than the magnitude of the printing field but greater than a magnitude of a field below which little change in magnetization occurs.

The first field, the third field and the printing field are reverse fields, and the second field is a forward field.

Applying the printing field includes providing a master having ferromagnetic teeth formed thereon, placing the ferromagnetic teeth into proximity with the surface of the storage medium after applying the preconditioning fields and applying the printing field to cause a change in magnetization only in regions on the surface of the medium between the teeth to produce the pattern of magnetic transitions.

The pattern is a reference pattern from which a servo pattern is constructed.

In another aspect, the invention provides for a media printing system that includes a printing device configured to generate a pattern on a magnetic storage medium, the pattern comprising a pattern of magnetic transitions, and a preconditioning device configured to precondition the magnetic storage medium to reduce the range of magnetic switching fields required to generate the pattern from the range of magnetic switching fields required to generate the pattern without the preconditioning.

Particular implementations of the invention may provide one or more of the following advantages.

Undesirable subpulses are eliminated without requiring further advances in the master manufacturing process capabilities. As a result of the preconditioning, all of the "easy-to-switch" grains (i.e., the sources of subpulses under master disk teeth) and "hard-to-switch" grains (i.e., the sources of subpulses between the master disk teeth) are premagnetized in the direction of the printing field. At the same time, grains with intermediate switching fields are magnetized in a direction opposite to the direction of the printing field. Only these intermediate switching grains change orientation in response to the printing field. Therefore, the range of the switching fields needed to cause switching between the teeth and prevent switching under the teeth is reduced by removing both the high field and the low field tails of the switching distribution, making it easier to achieve a clean printed pattern.

Other features and advantages of the invention will be apparent from the following detailed description and from the claims.

DESCRIPTION OF DRAWINGS

Like reference numbers will be used to represent like elements.

DETAILED DESCRIPTION

Figure 1:
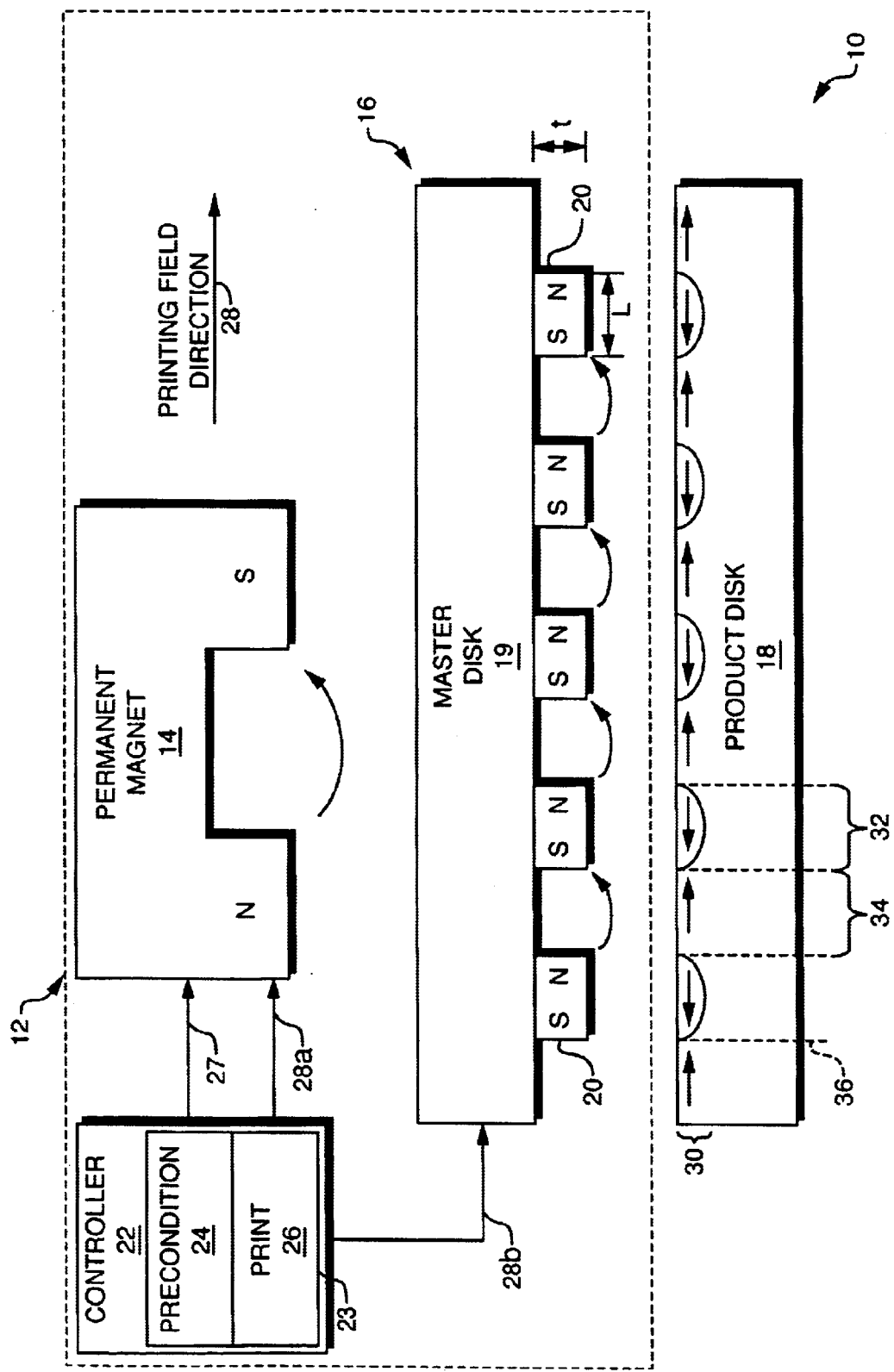
FIG. 1 is a diagram of a system that includes a storage medium and a preconditioning/printing station that uses a permanent magnet in conjunction with a master disk having ferromagnetic teeth to print a magnetic reference pattern on the storage medium.

FIG. 1 shows a system 10 for magnetic printing of storage media. The system 10 includes a preconditioning/printing station 12 that uses a permanent magnet 14 and a master disk 16 to print a reference pattern on a product storage medium 18, e.g., a disk (as shown). The magnet 14 is rotated in a circumferential direction to produce adjacent reference pattern segments, each containing magnetic transitions oriented primarily in the radial direction. It will be appreciated that a cross-sectional side view of only a portion of the disks 16 and 18 corresponding to such a reference pattern segment is shown.

The master disk 16 includes a silicon substrate 19. Formed on one surface of the substrate 19 is an array of teeth 20. The teeth 20 are made of a ferromagnetic material such as Cobalt, or, preferably, Co—Fe alloy.

The station 12 includes a controller 22 that performs processes 23, including a preconditioning sequence 24, as well as a contact printing operation 26. The processes 23 may be implemented in software, hardware or a combination of software and hardware. The controller 22 controls the movement of the permanent magnet 14 relative to the master and product disks, and may be used to control the placement of the master disk 16 on the product disk 18 during printing. More particularly, the controller 22 uses the preconditioning process 24 to provide one or more preconditioning control signals 27 to the magnet 14 (or to a magnet support structure, not shown) to control the movement of the magnet relative to the product disk 18 during application of a set of fields during preconditioning of the product disk 18, as will be described. The controller 22 uses the print process 26 to provide one or more printing control signals 28a to the magnet 14 to control the movement of the magnet 14 relative to both the master disk 16 and product disk 18 during printing. The controller 22 may provide one or more printing control signals 28b to the master disk 16 (or more specifically, to a master disk support structure, not shown) to position the master disk over the product disk 18.

During printing, the master disk 16 with the ferromagnetic teeth 20 is placed on the product disk 18 so that the teeth 20 are in contact with an upper surface 30 of the product disk 18. Once the master disk 16 is in position, the controller 22 applies a printing field $H_{print}$ to the disk 18 by moving the magnet 14 over the master disk 18. The direction of the printing field $H_{print}$ is indicated by arrow 28.

The preconditioning process 24 is a multi-step process that premagnetizes the product disk 18 prior to printing (and thus prior to the placement of the master disk 16 over the product disk 18), and does so in a manner designed to eliminate the occurrence of subpulses which are seen with conventional preconditioning, as will be described.

In a conventional preconditioning process, the product disk 18 is premagnetized with a field that is opposite to the printing field $H_{print}$. The strength of that preconditioning field $H_{max}$ has an absolute value that is significantly larger than that of the saturation field, $H_{sat}$, of the medium. Thus, all of the grains in the medium are magnetized uniformly in the direction opposite to the printing field direction.

Ideally, the magnitude (or strength) of $H_{print}$ is selected to be that of the remanent coercive field (or coercivity field) of the media, $H_c$. This is the magnitude of opposite field that results in zero magnetization after the field is removed.

The teeth 20 partly shield this printing field in the regions directly below them, that is, in regions 32. Ideally, the medium experiences little or no magnetization change in this region because the net field magnitude (due to the presence of the teeth) is less than the magnitude of the field $H_{knee}$, the maximum field at which significant magnetization change begins to occur. If the magnitude of $H_{knee}$ is exceeded, however, the resulting magnetic imprint near the center of the tooth results in spurious subpulses that interfere with the servo write position error signal (PES).

Between the teeth, in regions 34, the net field strength must exceed the value of $H_{sat}$ everywhere in order to avoid incomplete switching in those regions. The incomplete switching results in the generation of subpulses there as well. Therefore, the master pattern must be capable of magnifying the strength of the printing field above that of $H_{sat}$ in regions 34 and suppressing it below that of $H_{knee}$ in regions 32 to avoid subpulses in all of the locations. Borders 36 between the regions 32 and 34 form a pattern of magnetic transitions.

Because of symmetry, the field contribution from a saturated repetitive array of teeth at the locations in the center of regions 32, 34 is $$\Delta H_{teeth} = tB_{toothsat}/2L \tag{1}$$

where t is the tooth thickness, $B_{toothsat}$ is the saturation flux density, and L is the tooth and spacing width.

Manufacturing processes that are used to pattern the master teeth do not allow sufficient thickness to satisfy the "no subpulse" conditions under the teeth, $$H_{under} = |H_{print}| - \Delta H_{teeth} < |H_{knee}| \tag{2}$$

and between the teeth, $$H_{between} = |H_{print}| + \Delta H_{teeth} > |H_{sat}|. \tag{3}$$

The preconditioning sequence 24 overcomes this difficulty by reducing the effective difference between $|H_{sat}|$ and $|H_{knee}|$. It thus allows the conditions expressed by Equations (2) and (3) to be met with a tooth thickness that is consistent with existing master disk deposition process capabilities.

Figure 2:
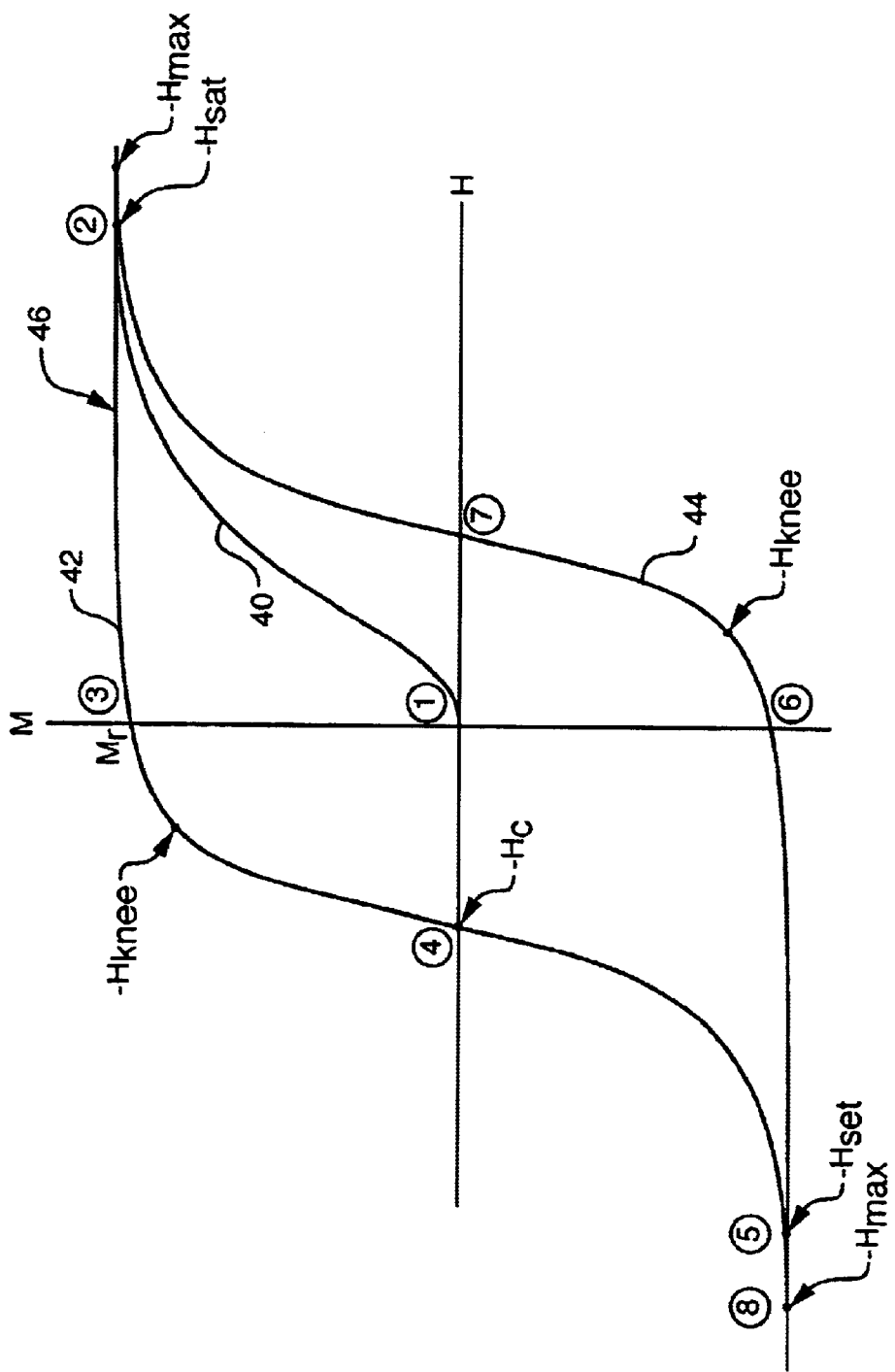
FIG. 2 is an illustration of an exemplary magnetization curve and remanent loop for magnetization M versus applied field H.

Before turning to the details of the multi-step preconditioning process 24, it may be helpful to view a basic, exemplary magnetization curve and remanent loop that serves to characterize the ferromagnetic materials under discussion. Referring to FIG. 2, consider a ferromagnetic material that is originally unmagnetized (point "1"). As the strength of external magnetic field H is increased, the value of induced magnetization M also increases. The induced magnetization eventually saturates at the saturation field $H_{sat}$ (point "2"), which was mentioned earlier. The curve between points "1" and "2" is called the magnetization curve (indicated by reference number 40). If the strength of the external field H is reduced, the value of the induced magnetization also is reduced, but does not follow the original curve 40. Instead, it follows curve 42. The material retains a certain permanent magnetization called the remanent magnetization $M_r$ (point "3"). Thus, the remanent magnetization is the permanent magnetization that remains after the external field is removed. If the strength of field H is reduced further so that the field H is applied in the negative direction, the remanent magnetization is eventually removed (point "4"). The field for which $M_r$ returns to zero is the coercivity field, $-H_c$. The product of $M_r$ and the coercivity field $|H_c|$ is termed the strength of the magnet. As the field H continues to reverse, magnetization M of the opposite sign is created in the material. Thus, the magnetization M increases in the negative direction until it again reaches saturation, $-H_{sat}$ (point "5"). A similar curve (curve 44) can be traced in the opposite direction for M with saturation (at point "5"), remanent magnetization (point "6") and coercivity (point "7"). The magnetization curves 42 and 44 form a loop 46 called the remanent loop. Also shown on the loop 46 are positive/negative points corresponding to field magnitudes of the $H_{knee}$ and $H_{max}$ fields mentioned above with reference to preconditioning. Again, the value $|H_{knee}|$ is the field value at which grains start to switch (that is, reverse their orientation). The value of $|H_{max}|$ is an arbitrary value that is greater than saturation. For the remainder of the description, H will be described in terms of absolute values only.

The processes 23, including the preconditioning process 24 and subsequent printing process 26, will now be described with reference to the flow diagram of FIG. 3 and to FIG. 4, which shows the remanent loop 46 (from FIG. 2) as modified by the preconditioning process 24. As mentioned above, and referring briefly to FIG. 1, during the preconditioning process 24, the magnet movement relative to the product disk 18 occurs in the absence of the master disk 16. The proximity of the magnet to the product disk determines the strength of preconditioning and print fields. The preconditioning process 24 begins by applying a first, very high field, $|H_{max}|$ of a magnitude that is greater than the magnitude of $|H_{sat}|$ to achieve positive orientation for all of the grains on the surface 30 of the product disk 18 (step 50). The term "positive orientation" refers to being in the same direction as the printing field and the term "negative orientation" refers to being in the direction opposite to that of the printing field. In the illustration of FIG. 4, the field $|H_{max}|$ is a reverse field and thus corresponds to point "A". At this point in the process, all of the grains for the loop 56 are pointing in the direction of the arrows labeled "a". The preconditioning process 24 applies a second field, $|H_{med}|$, the magnitude of which is chosen to be less than that of $(1-\epsilon)|H_{sat}|$ and greater than that of $|H_c|$ to achieve negative orientation for all grains with a switching field of a magnitude less than $|H_{med}|$ (step 52). With respect to the loop 56, the field $|H_{med}|$ is a forward field and thus corresponds to point "B". The change in magnetization direction by a portion of the grains as a result of the application of the field $|H_{med}|$ is indicated by the arrows labeled "b". The offset parameters $\epsilon$ and $\delta$ are chosen such that the field $|H_c|$ is $[(1-\epsilon)H_{sat}+(1+\delta)H_{knee}]/2$. The fields $(1-\epsilon)H_{sat}$ and $(1+\delta)H_{knee}$ define bounds of a range of switching field thresholds. The preconditioning process 24 applies a third field, $|H_{min}|$, the magnitude of which is chosen to be greater than that of $(1+\delta)|H_{knee}|$ and less than that of $|H_c|$ to achieve positive orientation for all grains with a switching field less than $|H_{min}|$ (step 54). Again referring to the loop 56 of FIG. 4, the field $|H_{min}|$ is a reverse field and corresponds to point "C". As a result of this third preconditioning step 54, a portion of the grains that had been switched by the second preconditioning step 52 are switched back to the same direction that they were in as a result of the first preconditioning step, step 52. The change in direction by those grains as a result of the application of the field $|H_{min}|$ is indicated by the arrow labeled "c".

In effect, the premagnetization sequence of steps 50, 52, 54 creates 3 different populations of grains based on switchability. As shown in FIG. 4, a first population 60 represents the "hard-to-switch" grains, a second population 62 represents the "easy-to-switch" grains and a third population 64 represents grains have an intermediate level of switchability.

It will be understood that the solid arrows a, b, c indicate the final direction of grain populations 60, 64, 62, respectively, upon completion of the multi-step preconditioning process 24.

As a result of the preconditioning process 24, all of the grains in the populations 60 and 62 are premagnetized in the same direction as the printing field, and the grains in the population 64 are premagnetized in the direction opposite to the printing field.

There are various factors that will determine how easy it is to magnetize a grain in a particular direction for a given applied field. Those factors include orientation, size and crystal structure of the grains. The magnetization of a grain whose N-S axis orientation is vertical or horizontal may be more difficult to switch to the opposite direction than a grain whose N-S axis orientation is at a 45-degree angle. With respect to size, a smaller grain is more easily switched than a larger grain, as the larger grain is more thermally stable. The crystal structure or crystallography of the material also plays a role as well. For example, it is easier to change the direction of magnetization of a grain having a closely packed HCC crystal structure than a grain having a more loosely packed FCC crystal structure.

Returning to FIG. 3, once the premagnetization sequence of steps 50, 52, 54 is completed, and the master disk 16 has been placed on or brought into contact with the surface 30 of the product disk 18, the printing process 26 applies the printing field $H_{print}$ (of a magnitude equal to that of $H_c$)(step 26) to the surface 30 of the product disk 18, resulting in the switching of only the intermediate switching grains 64. Thus, the range of the switching field, which had been between $H_{knee}$ and $H_{sat}$, has been reduced to a range between $H_{min}$ and $H_{med}$ by removing both the high field tail of the switching distribution (population 60) and the low field tail of the switching distribution (population 62). Therefore, the conditions for eliminating subpulses (Eq. 2 and 3) are more easily met.

Figure 3:
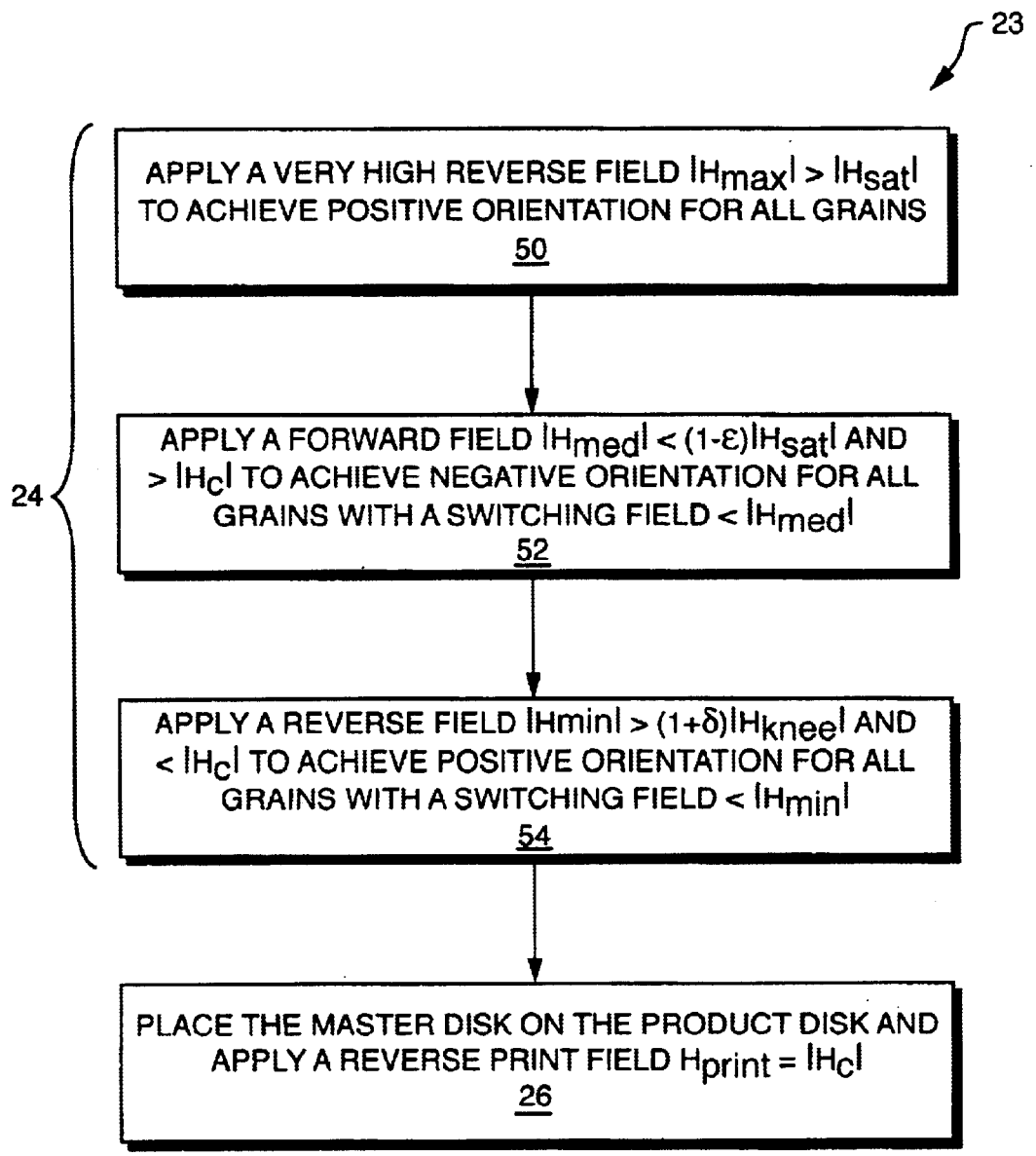
FIG. 3 is a flow diagram illustrating the overall process of applying a preconditioning sequence to and printing a reference pattern on a storage medium.
Figure 4:
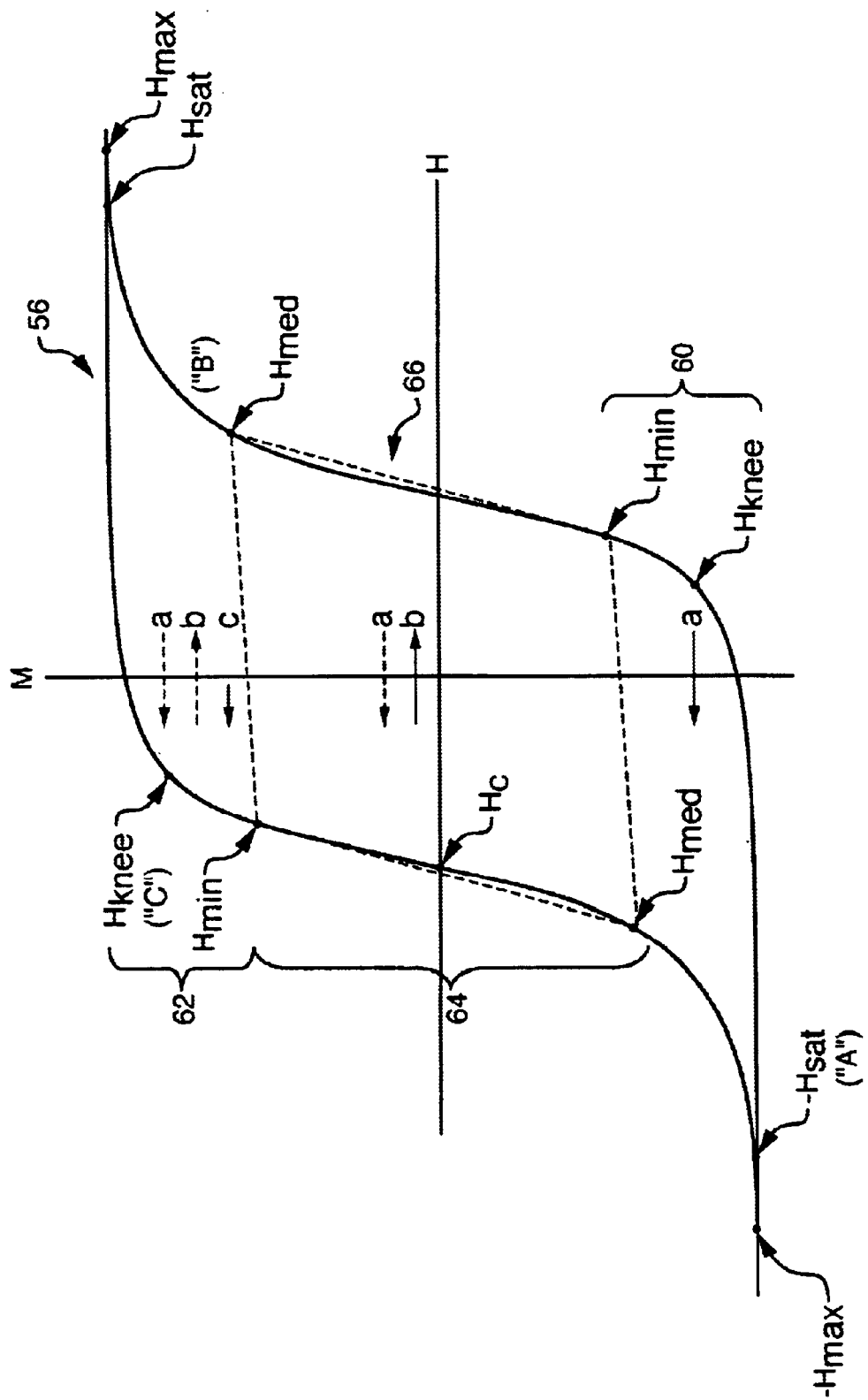
FIG. 4 is an illustration of a remanent loop that characterizes magnetization M as a function of an applied field H for fields applied to a storage medium by the preconditioning sequence.

In the embodiment depicted in FIGS. 3 and 4, a reverse field is applied in steps 50, 54 and 26, and a forward field is applied in step 52. It will be appreciated, however, that the same results could be achieved by applying a forward field in steps 50, 54 and 26, and a reverse field in step 52. In other words, with respect to direction, all that is required is that the direction of the field for steps 50, 54 and 26 be the opposite of the direction of the field for step 52.

The values of $\epsilon$ and $\delta$ are chosen so that the magnetization swing losses are minimal for a minimum range of switching fields:

$$\Delta H_{switch} > (1-\epsilon)H_{sat} - (1+\delta)H_{knee} \tag{4}$$

Thus, and referring back to FIG. 1, the multi-pass preconditioning process 24 (as illustrated in FIGS. 3 and 4) has the effect of reducing the overall range of switching fields required to cause switching to occur in regions between the teeth (regions 34) and prevent switching from occurring in the shielded regions that are under the teeth (that is, regions 34) during the magnetic printing process 26. In other words, the net value of switching fields between the teeth and under the teeth need only be greater than the value of $H_{med}$ and less than the value $H_{min}$, respectively, (instead of greater than the value of $H_{sat}$ and less than the value of $H_{knee}$, respectively, as stated in Equations 2 and 3 above).

In the described embodiment, the pattern that is printed on the media is a reference pattern to be used in generating servo patterns. Thus, once the reference pattern defined by the master disk has been successfully printed on the product disk 18, the pattern is used by a servo self-write process to construct a servo pattern, preferably, for product compatibility purposes, a servo pattern of the type produced by a servo writer. Details of an exemplary servo self-write process may be had with reference to U.S. Pat. No. 6,304,407.

Although the preconditioning process 24 has been described in a storage disk servo context, it will be understood that the process 24 is also applicable to other types of printed media.

Other embodiments are within the scope of the following claims.

What is claimed is:

1. A method of printing on a storage medium, comprising:

applying preconditioning fields to the storage medium to precondition the storage medium prior to applying a printing field, one of the preconditioning fields magnetizing the storage medium in a direction of the printing field and at least another of the preconditioning fields magnetizing the storage medium in a direction opposite to the direction of the printing field; and applying the printing field to the preconditioned storage medium to produce a pattern of magnetic transitions thereon.

2. The method of claim 1, wherein applying the preconditioning fields comprises:

applying a first field of a first magnitude to magnetize a first population of grains of the material in the surface of the medium in the direction of the printing field;

applying a second field of a second magnitude to magnetize a second population of grains of the material in the surface of the medium in a direction opposite to the direction of the printing field; and applying a third field of a third magnitude to magnetize a third population of grains of the material in the surface in the direction of the printing field.

3. The method of claim 2, wherein the first, second and third magnitudes are chosen so that magnetization of only a portion of the second population is changed by the application of the printing field.

4. The method of claim 2, wherein the first magnitude is greater than a magnitude of a saturation field, the second magnitude is less than the magnitude of the saturation field and greater than a magnitude of the printing field, and the third magnitude is less than the magnitude of the printing field but greater than a magnitude of a field below which little change in magnetization occurs.

5. The method of claim 2, where the first field, the third field and the printing field are reverse fields, and the second field is a forward field.

6. The method of claim 4, wherein applying the printing field comprises:

providing a master having ferromagnetic teeth formed thereon;

placing the ferromagnetic teeth into contact with the surface of the storage medium after applying the preconditioning fields; and applying the printing field to cause a change in magnetization only in regions on the surface of the medium between the teeth to produce the pattern of magnetic transitions.

7. The method of claim 1, wherein the pattern is a reference pattern from which a servo pattern is constructed.

8. An apparatus for printing on a storage medium, comprising:

means for applying preconditioning fields to the storage medium to precondition the storage medium prior to applying a printing field, one of the preconditioning fields magnetizing the storage medium in a direction of the printing field and at least another of the preconditioning fields magnetizing the storage medium in a direction opposite to the direction of the printing field; and means for applying the printing field to the preconditioned storage medium to produce a pattern of magnetic transitions thereon.

9. The apparatus of claim 8, wherein the means for applying the preconditioning fields comprises:

means for applying a first field of a first magnitude to magnetize a first population of grains of the material in the surface of the medium in the direction of the printing field;

means for applying a second field of a second magnitude to magnetize a second population of grains of the material in the surface of the medium in a direction opposite to the direction of the printing field; and means for applying a third field of a third magnitude to magnetize a third population of grains of the material in the surface in the direction of the printing field.

10. The apparatus of claim 9, wherein values of the first, second and third magnitudes are chosen so that magnetization of only a portion of the second population is changed by the application of the printing field.

11. The apparatus of claim 9, wherein the first magnitude is greater than a magnitude of a saturation field, the second magnitude is less than the magnitude of the saturation field and greater than a magnitude of the printing field, and the third magnitude is less than the magnitude of the printing field but greater than a magnitude of a field below which little change in magnetization occurs.

12. The apparatus of claim 9, where the first field, the third field and the printing field are reverse fields, and the second field is a forward field.

13. The apparatus of claim 11, wherein the means for applying the printing field comprises:

means for providing a master having ferromagnetic teeth formed thereon;

means for placing the ferromagnetic teeth into contact with the surface of the storage medium after applying the preconditioning fields; and means for applying the printing field to cause a change in magnetization only in regions on the surface of the medium between the teeth to produce the pattern of magnetic transitions.

14. The apparatus of claim 13, wherein the ferromagnetic teeth are made of Cobalt.

15. The apparatus of claim 13, wherein the ferromagnetic teeth are made of a Co—Fe alloy.

16. The apparatus of claim 8, wherein the pattern is a reference pattern from which a servo pattern is constructed.

17. A media printing system comprising:

a printing device configured to generate a pattern on a magnetic storage medium, the pattern comprising a pattern of magnetic transitions; and a preconditioning device configured to precondition the magnetic storage medium to reduce the range of magnetic switching fields required to generate the pattern from the range of magnetic switching fields required to generate the pattern without the preconditioning.

* * * * *